Nov. 11, 1930.                S. B. REDFIELD                1,781,032
                          CONNECTION FOR DRILL RODS
                             Filed Jan. 12, 1929

INVENTOR.
Snowden B. Redfield
BY
HIS ATTORNEY

Patented Nov. 11, 1930

1,781,032

UNITED STATES PATENT OFFICE

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY

CONNECTION FOR DRILL RODS

Application filed January 12, 1929. Serial No. 332,129.

This invention relates to core drilling apparatus, but more particularly to a connection for connecting sections of a drill rod together.

One object of the invention is to enable sections of the drill rod to be readily connected or disconnected.

Other objects will be in part obvious and in part pointed out hereinafter.

Figure 1:
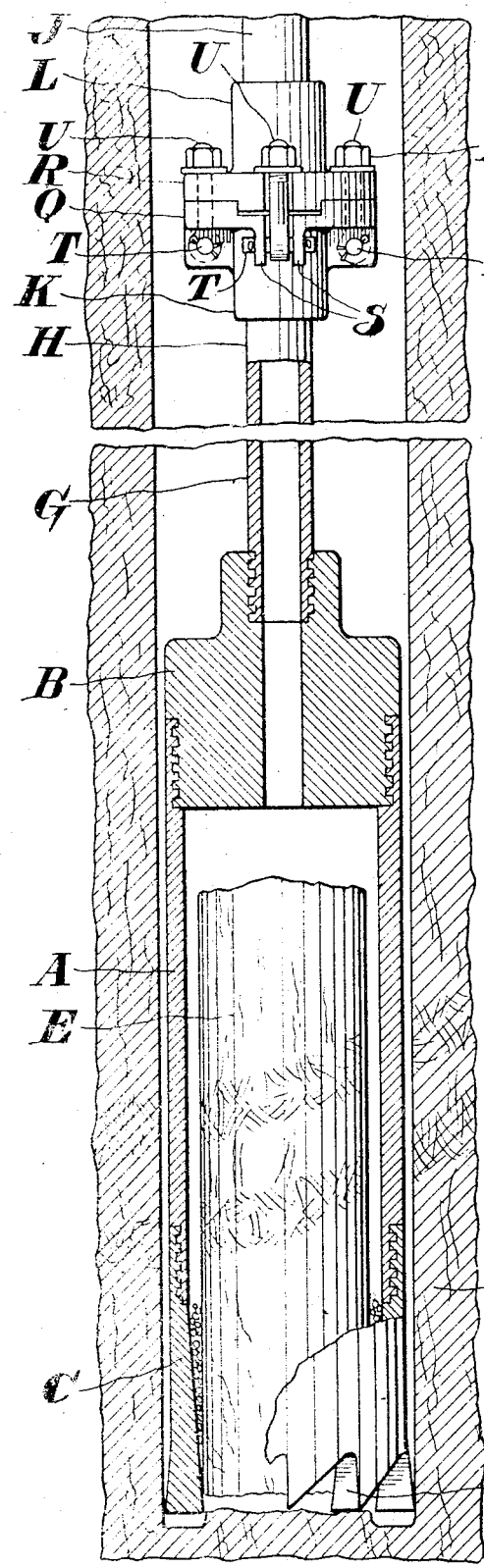
Figure 3:
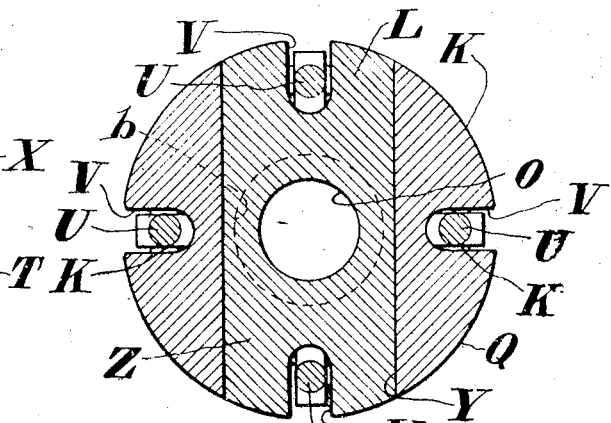
Figure 2:
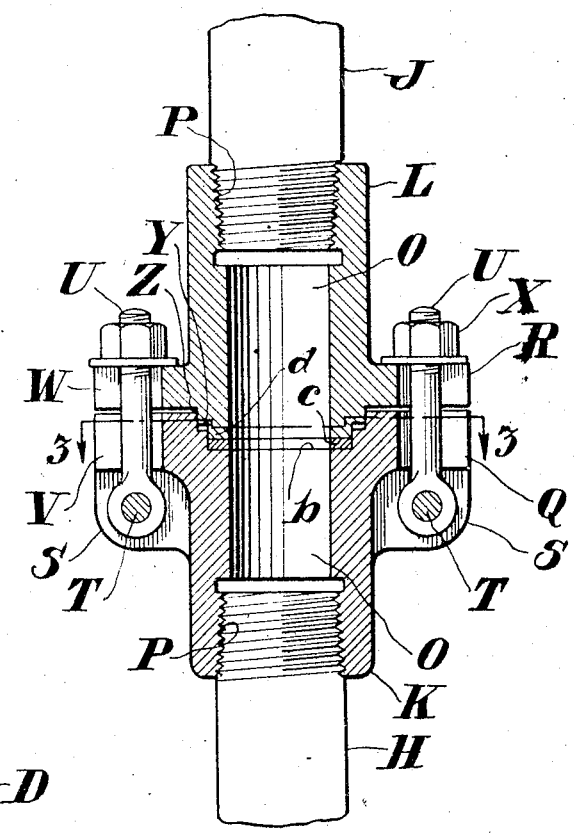

In the drawings illustrating the invention and in which similar reference characters refer to similar parts, Figure 1 is an elevation partly in section of a core drill bit and the drill rod showing sections of the drill rod connected by a connection constructed in accordance with the practice of the invention, Figure 2 is an enlarged sectional elevation of the connection, and Figure 3 is a tarnsverse view taken through Figure 2 on the line 3—3 looking in the direction indicated by the arrows.

Referring to the drawings in which are shown the essential parts of a calyx core drill, A represents a core barrel which is threaded at its rearward end to a head B and at its forward end to a core bit C. The core bit C may be of any known type adapted for cutting an annular groove in the material, such as the rock D, to remove a core E therefrom. In the present instance the bit C is provided in its cutting end with teeth F whereby the material is cut.

The means whereby the core barrel is connected to the driving apparatus, such as a rotary drill (not shown) is in the form of a hollow rod or pipe G preferably formed in sections H and J so that as the cutting bit C penetrates the rock, rod sections may be added to those connected with the drill bit. This is considered desirable since it eliminates the necessity of handling rods of excessive length while the drill hole is still shallow or when holes of only small depth are being drilled.

Formerly, in devices of this character, it has been customary to join the various sections of the drill rod together by means of threaded connection interposed between the sections and, as the drilling progressed, sections were added to the main rod by threading other sections to the connection. When the apparatus is in the operative position, that is, in a substantially vertical position, the addition of sections to the drill rod by means of threading them thereto becomes a difficult matter.

After some usage the threaded connections usually become corroded or battered or both, thus making it practically impossible to again disconnect the sections of the rod. One expedient which has frequently been resorted to for again separating the sections is to cut off the drill rod adjacent the connection, rethreading the end thereof to accommodate another threaded connection. This obviously entails a considerable loss in time and also adds greatly to the expense of drilling, particularly where holes of great depth are being drilled. The present invention contemplates eliminating the aforesaid objectionable feature in devices of this character, and means are accordingly provided to enable the several sections of the drill rod to be readily coupled together or to be disconnected whenever it is desired to extend the drill rod or to shorten it. To this end the opposing ends of the rod sections H and J are threaded to accommodate coupling members K and L. The coupling members K and L have passages O therethrough and the outer ends of said passages O are threaded as at P for engagement with the threaded ends of the rod sections H and J.

At the adjacent ends of the coupling members K and L are lateral flanges Q and R respectively. Beneath the flange Q are a series of lugs S which serve as bearings for pivot pins T on which are mounted eye-bolts U. The eye-bolts U are adapted to rock through slots V and W in the flanges Q and R respectively and are provided with nuts X which act against the flange R for drawing the coupling members K and L together.

In apparatus of the type to which the invention pertains the elements which connect the cutting bit with the driving apparatus are subjected to great strains. It is therefore essential that they be sufficiently rugged to withstand any strain to which they may be subjected so that the cutting element may not become lost in the drill hole. In view of this consideration means are provided for protecting the bolts U against any shearing action which might otherwise take place between the flanges Q and R, the object being that the only function of the bolts U will be to clamp the coupling members together. To this end the coupling member K is provided with a slot Y which extends across the end face of the member K adjacent the flange Q and is of a width somewhat wider than the diameter of the passage O. The coupling member L carries a projection Z which extends slidably into the slot Y. The projection engages the side walls of the slot and acts as a key for holding the members K and L securely against any form of relative rotary movement.

In order to seal the connection the member K is provided with an annular recess b to receive a packing, as for instance, a gasket c which, when the nuts X are tightened on the bolts U, will be compressed by a boss d on the member L which extends into the recess b and serves to centralize the members K and L with respect to each other.

In practice, after the drill rod sections, such as H and J, have been provided with the coupling members K and L, the drill rod sections may be brought together endwise in such manner that the projection Z may be moved into engagement with the slot Y, the bolts U may then be rocked into the operative position and the nuts X tightened to clamp the rod sections securely together.

During the operation of the device, the thrust between the sections of the drill rod will be transmitted from the projection Z to the side walls of the slot. When placed in the assembled position, there will be no relative movement between these members and therefore the bolts U will be protected against any strains other than that of holding the members together.

The present invention has been found to be unusually efficient in practice and eliminates the unnecessary delays incident to uncoupling adjacent sections of the drill rod.

I claim:

1. A connection for drill rods, comprising a pair of members, said members having passages therethrough, threads in the ends of the passages for threaded connection with sections of a drill rod, one of said members having a slot across one end, a projection on the other member extending into the slot and engaging the side walls of said slot to prevent relative rotation between the members, a recess in one member, a boss on the other member extending into the recess to centralize the members with respect to each other, and means for clamping the members together.

2. A connection for drill rods, comprising a pair of members adapted for connection to sections of a drill rod, one of said members having a slot across one end and an annular recess, a packing in the recess, a projection on the other member extending slidably into the slot and engaging the side walls of said slot to prevent relative rotation between the members, a boss on the projection bearing against the packing and extending into the recess to hold the members in coaxial relationship, and means for clamping the members together and for compressing the packing.

3. A connection for drill rods, comprising a pair of sections, lateral flanges on the sections having radial slots, said members having passages therethrough, threads in the passages for threaded connection with sections of a drill rod, one of said members having a slot across one end and an annular recess, a packing in the recess, a projection on the other member extending slidably into the slot to engage the side walls of said slot to prevent relative rotation between the members, a boss on the projection bearing against the packing and extending into the recess to hold the members in coaxial relationship, eye-bolts pivoted on one flange and adapted to lie in the radial slots, and nuts on the eye-bolts for clamping the members securely together and for compressing the packing.

In testimony whereof I have signed this specification.

SNOWDEN B. REDFIELD.